United States Patent [19]

Morrell et al.

[11] Patent Number: 4,494,224
[45] Date of Patent: Jan. 15, 1985

[54] PIPE MEASURING METHOD AND APPARATUS

[76] Inventors: David J. Morrell, 4330 N. Grandview, No. 1506; Donald G. DeVault, 2731 Chestnut Ave.; William K. Sands, Jr., 2607 Beechwood St., all of Odessa, Tex. 79762

[21] Appl. No.: 398,972

[22] Filed: Jul. 16, 1982

[51] Int. Cl.³ .............................................. G01S 15/12
[52] U.S. Cl. .......................................... 367/2; 367/99; 367/108; 367/115; 367/902; 367/910
[58] Field of Search .................. 367/2, 902, 99, 107, 367/108, 113, 114, 115

[56] References Cited

U.S. PATENT DOCUMENTS

| | | | |
|---|---|---|---|
| 3,076,519 | 2/1963 | Alsabrook | 367/2 |
| 3,834,233 | 9/1974 | Willis et al. | 367/902 |
| 4,210,969 | 7/1980 | Massa | 367/108 |
| 4,241,430 | 12/1980 | Kayem et al. | 367/115 |
| 4,254,478 | 3/1981 | Dumas | 367/2 |

OTHER PUBLICATIONS

Radio Shack Dictionary of Electronics, p. 28, Fourth Edition, 1974.

Primary Examiner—Richard A. Farley
Attorney, Agent, or Firm—Glaser, Griggs & Schwartz

[57] ABSTRACT

Method and apparatus for determining the length of a tubular member such as a pipe are disclosed. A burst of acoustical pulses are emitted from a sending unit and are received by a reference acoustical transducer and by a slave acoustic transducer. The slave transducer emits a return pulse which is used to compute the duration of the sound propagation interval between the ends of the pipe. A phase angle compensation factor is computed by measuring the phase shift of the signal received by the reference transducer with respect to the signal emitted by the master transducer.

7 Claims, 11 Drawing Figures

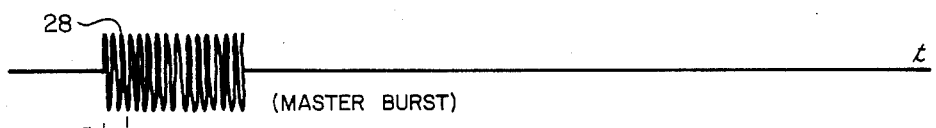
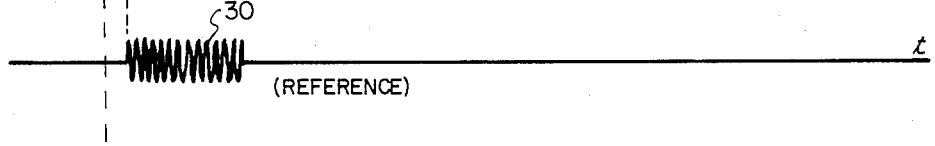
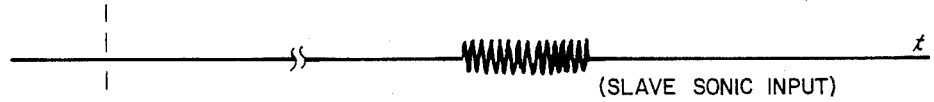
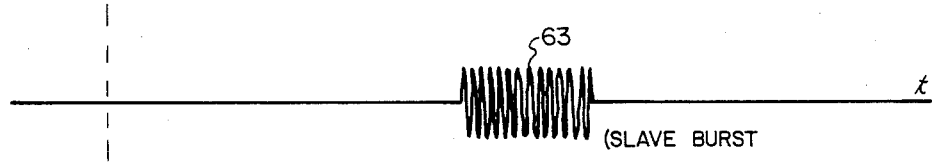
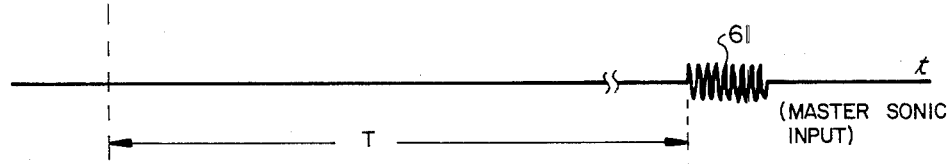
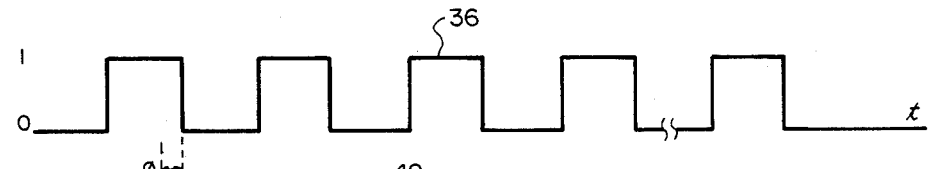
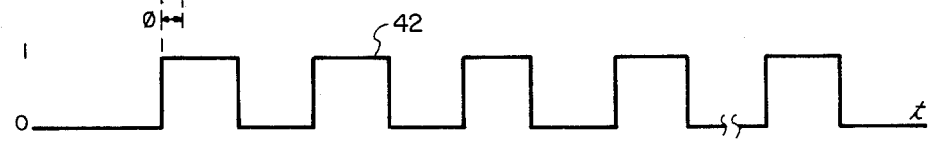
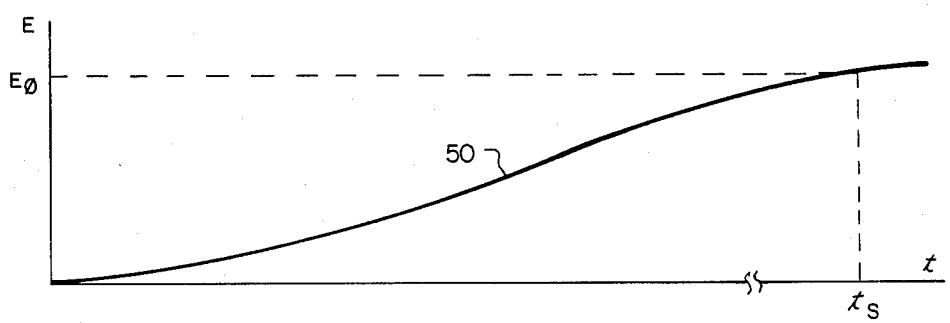
FIG. 5

PIPE MEASURING METHOD AND APPARATUS

BACKGROUND OF THE INVENTION

1. Field of the Invention

This invention relates to method and apparatus for determining the length of an elongated tubular member such as a length of drill pipe or well casing, and in particular to electro-acoustic measuring apparatus.

2. Description of the Prior Art

It is common practice in the petroleum production business and in other industries to stack various lengths of pipe in the same storage location. It is important for a number of reasons to determine the length of each pipe within a close tolerance. For example, in the petroleum production industry, various categories of tubing, for example Range I tubing (17'-27') may be stacked together with Range II tubing (27'-37') and Range III tubing (37'-47'). It is common practice to inspect such tubing by non-destructive testing means, and to apply a protective coating to the tubing. The service costs for these procedures are charged by the foot. Thus, on a cost basis, it is desirable to be able to accurately determine the total length of tubing involved before it is released.

Present pipe measuring procedures involve the use of a forklift for physically removing and handling lengths of pipe, and three or more persons to perform the actual measurement of each pipe with a steel tape measure. Two persons operate the tape measure, with one person recording the length information and one forklift operator moving the pipe. The best accuracy presently obtainable by such methods is $\frac{3}{8}''-\frac{3}{4}''$ for 47' pipe lengths. However, such procedures are prohibitively time consuming and expensive because of the personnel and equipment required, and involve risk of personal injury.

Recently, electro-acoustic apparatus has been developed for accurately measuring the lengths of pipe. Such apparatus commonly employs electronic circuits and electro-acoustic transducers for accurately determing the length of the pipe. However, such instruments have not met with widespread acceptance because of the lack of repeatability in the measurements. This is believed to be caused in part by naturally occuring variations in ambient temperature, atmospheric pressure and air density. Improvements to such instruments have included circuits for sensing temperature and pressure for accurately determining the speed of sound so that accurate, repeatable measurement can be made. Because of this added circuitry, such instruments are relatively complex and expensive. There is a continuing interest in simplifying the equipment for carrying out measurements by electro-acoustic means, and in particular to improving the accuracy and repeatability of measurements made with such instruments.

SUMMARY OF THE INVENTION

Method and apparatus for determining the length of a tubular member such as a pipe are disclosed. A burst of acoustical pulses is emitted from a sending unit and is received by a reference acoustical transducer and by a slave acoustic transducer. The slave transducer emits a return pulse which is used to compute the duration of the sound propagation interval between the ends of the pipe. A phase angle compensation factor is computed by measuring the phase shift of the signal received by the reference transducer with respect to the signal emitted by the master transducer.

Electrical pulse train signals corresponding with the master acoustical pulse burst signal and the acoustical burst pulse signal received by the reference transducer are input to an exclusive OR gate. The output of the exclusive OR gate is a pulse train signal characterized by pulses having a width porportional to the duration of coincidence of pulses in the master burst signal and the reference signal. The output pulse train signal is integrated to produce an electrical analog of the phase angle factor which is proportional to the integrated sum of the time shift pulse train signals. The analog phase angle factor and the time factor are input to a microprocessor which calculates the ratio $L = KfDT/\phi$ where L is the length between the master and slave transducers, K is a constant, f is the pulse repetition frequency of the master acoustical burst and cycles per second, D is the distance between the master transducer and the reference transducer, T is the round trip propagation time of a sound wave between the master transducer and the slave transducer, and $\phi$ is the phase angle factor in degrees.

The novel features which characterize the invention are defined by the appended claims. The foregoing and other objects, advantages and features of the invention will hereinafter appear, and for purposes of illustration of the invention, but not of limitation, an exemplary embodiment of the invention is shown in the appended drawings.

BRIEF DESCRIPTION OF THE DRAWINGS

FIGS. 3A–3E illustrate graphically in the form of amplitude versus time the various acoustic waves which are emitted and received by the pipe measuring apparatus of FIG. 1;

FIGS. 4A–4C illustrate graphically in the form of amplitude versus time the electrical analog waveforms generated by the pipe measuring apparatus for producing the phase angle correction factor;

FIG. 5 illustrates graphically in the form of amplitude versus time the integration of the pulse waveform shown in FIG. 4C.

DETAILED DESCRIPTION OF THE PREFERRED EMBODIMENT

Figure 1:
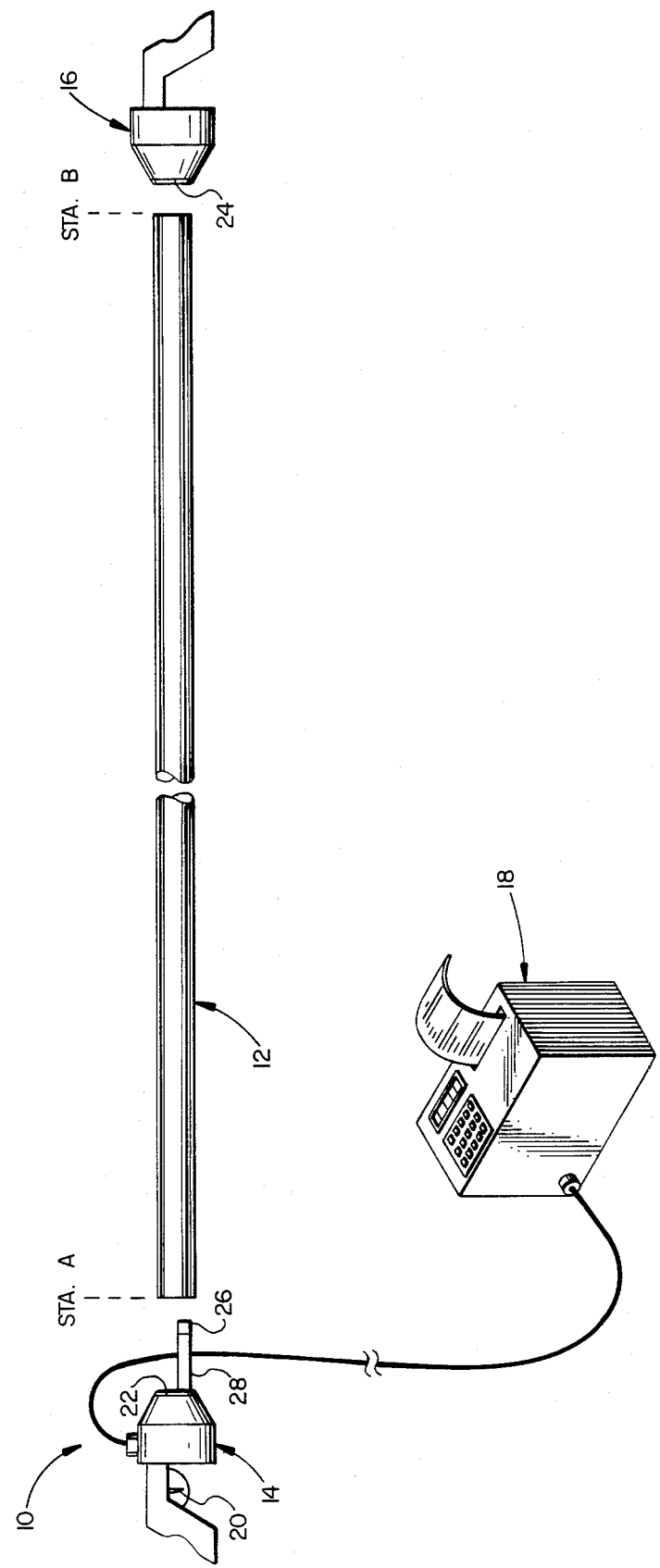
FIG. 1 is a perspective view of a hand-held pipe measuring apparatus shown in combination with a pipe to be measured.

In the description which follows, like parts are marked throughout the specification and drawings with the same reference numerals, respectively. The drawings are not necessarily to scale and in some instances proportions have been exaggerated in order to more clearly depict certain features of the invention.

Referring now to FIG. 1, electric acoustic measuring apparatus 10 is shown in association with a pipe 12. One end of the pipe 12 is designated as Station A and the opposite end is designated as Station B. The electric acoustic measuring apparatus 10 includes a master acoustic sending and receiving unit 14 and a slave acoustic receiving and sending unit 16. Coupled to the master sender/receiver 14 is a combination computer and printer 18.

It should be understood that although only one pipe is illustrated, the measuring apparatus 10 can be used to measure a pipe while it is in the stack, provided that there is access to both ends. Thus, there is no need to remove a pipe from a stack to accurately determine its true length. Only two operators are required, one operator at each end of the pipes.

The master sender/receiver 14 is a hand-held portable unit having a trigger switch 20 for actuating the measuring apparatus 10. The master sender/receiver 14 includes a tweeter acoustic transducer 22 which can be aligned in registration with the end of the pipe 12 at Station A. The slave sender/receiver 16 likewise is a hand-held unit which includes a tweeter 24 which can be placed in registration with the opposite end of the pipe 12 at Station B.

Figure 2:
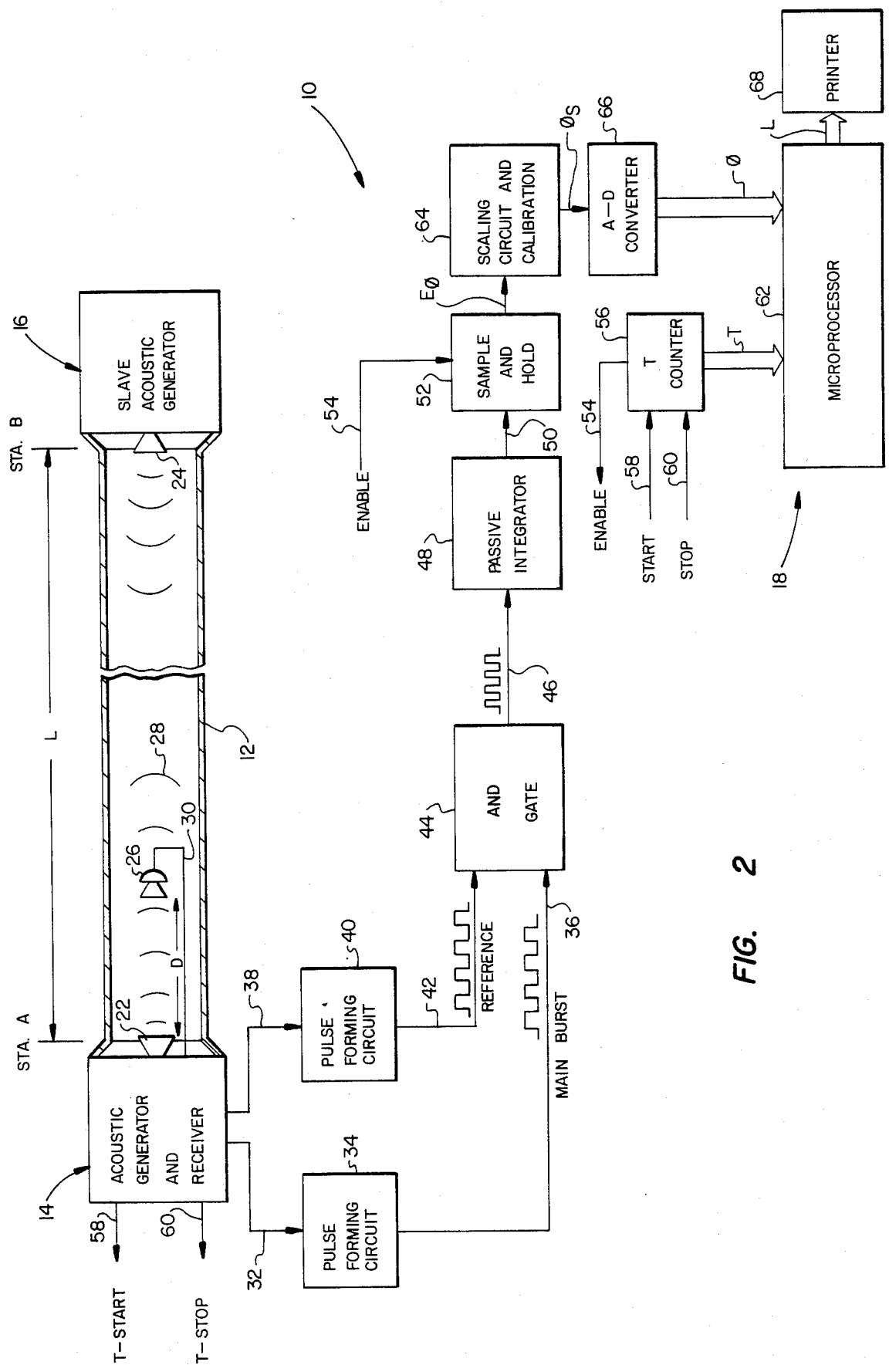
FIG. 2 is a simplified block diagram of the pipe measuring apparatus shown in FIG. 1.

According to an important feature of the invention, a reference acoustic transducer receiver 26 is supported on a support arm 28 forwardly of the master sender/receiver 14 at a fixed distance D (FIG. 2).

Referring now to FIG. 2 and FIGS. 3A–3E, the master sender/receiver 14 is coupled to the end of the pipe 12 at Station A, and the slave sender/receiver 16 is coupled to the opposite end of the pipe 12 at Station B. When the trigger 20 is depressed, the master sender 14 emits a burst 28 of acoustic pulses at a frequency $f=10$ KHZ. The burst 28 contains approximately 100 pulses. Because the sound waves are being propagated through ambient air, there is a slight phase shift $\phi$ between the acoustical signal 30 received by the reference acoustical transducer receiver 26 relative to the master burst 28. The magnitude of the phase shift is determined in part by the ambient temperature, air density, atmospheric pressure and temperature. According to the invention, these factors are not computed or calculated to determine the length L of the pipe 12. However, a phase angle factor $\phi$ is calculated by determining the extent of coincidence between the acoustic pulses as emitted by the master transducer 14 and the acoustic pulses as received by the reference transducer 26.

The phase angle factor $\phi$ is computed by generating electrical pulse train signals which correspond generally with the acoustical burst pulses as emitted by the master sender unit 14, and with the acoustical pulse signals as received by the reference receiver 26, respectively. Electrical impulse signals 32, which are used to drive the tweeter transducer 22, form the input of a pulse forming circuit 34. The electrical impulse signal 32 is amplified and shaped to form a logical pulse train signal 36 having a logical value of "1" whenever the acoustic wave emitted by the acoustic generator 14 has an amplitude in excess of a preselected level, and having a logical value of "0" whenever its amplitude is less than the preselected level.

The master acoustic generator unit 14 likewise develops an electrical impulse signal 38 in response to the electrical signal 30 produced by the reference acoustical receiver 26. The electrical pulse signal 38 is transformed by a pulse forming circuit 40 into a pulse train signal 42 having a locial "1" and logical "0" values, with the logical "1" values corresponding with the sound pulses as received by the reference transducer 26.

The pulse train signals 36, 42 form inputs to an AND gate 44. The AND gate 44 provides a logic "1" output when both of its inputs are at logic "1" and provides a logic "0" output for any other input combination. The result is the pulse train signal 46 as illustrated in FIG. 4C which has a pulse repetition frequency equal to the pulse repetition frequency of the main burst (10 KHZ), but which has a relatively narrow pulse width because of the phase shift caused by the propagation medium. The pulse width of the pulse train signal 46 is inversely proportional to the magnitude of the phase factor $\phi$, and is directly proportional to the duration of coincidence of pulse signals in the pulse train signal 36 and the pulse train signal 42. This shifted relationship between the two pulse trains is utilized to compute the phase angle correction factor $\phi$.

Referring now to FIGS. 2 and 5, the output signal 46 of the AND gate 44 is summed by a passive integrator 48. This summing process takes place during the interval (FIGS. 3A and 3B) that the master burst 28 occurs. The output of the passive integrator 48 is a rising waveform 50 which approachs a value E. At a time $t_s$ (FIG. 5), the integrated waveform 50 is sampled by a sample and hold circuit 52 in response to an enable signal 54. The enable signal 54 is generated by counter 56.

The enable signal 54 is produced by the counter 56 at a preset time after the master burst 28 has been emitted. The electrical value sampled at $t_s$ is $E_\phi$, which is determined at or near the end of the master burst.

The counter 56 is a digital counter which is started by a start signal 58 which is produced in response to the onset of the master burst 28. The counter 56 is stopped by a stop signal 60 which is generated in response to the detection of a sonic input signal 61 by the master receiver 14, in response to an acoustical burst signal 63 emitted by the slave sender unit 16. The counter 56 thus determines the time T which elapses during the interval between the time that the master burst 28 is emitted until the slave signal 61 is received (FIG. 3E). A digital data number T is produced by the counter 56 and forms the input to a microprocessor 62.

Thereafter, the analog value $E_\phi$ is amplified and scaled in the scaling and calibration circuit 64. The output of the scaling and calibration circuit is the phase angle correction factor $\phi_s$ in the form of a scalar quantity. The scalar factor $\phi_s$ is converted to a digital data number $\phi$ by an analog-to-digital converter 66. The output of the analog-to-digital converter 66 is the digitized quantity $\phi$ which forms an input to the microprocessor 62.

The length L of the pipe 12 is computed according to the following ratio: $L = KfDT/\phi$. In this ratio, K is a known calibration constant, f is the known pulse repetition frequency of the acoustical burst 28, D is the known distance between the master transducer 22 and the reference transducer 26, T is the round trip propagation time of a sound wave between the master transducer 22 and the slave transducer 24, and $\phi$ is the phase angle correction factor expressed in radian measure or in angular degrees. Upon computation of the quantities T and $\phi$, the microprocessor 62 computes the length L with a high degree of accuracy and repeatability. The microprocessor 62 generates a digital data word L which is input to an automatic printer 68 in the portable computer console 18.

Although a preferred embodiment of the invention has been described in detail, it should be understood that various changes, substitutions and alterations can be made therein without departing from the spirit and scope of the invention as defined by the appended claims.

What is claimed is:

1. Apparatus for measuring the distance L between two stations in a propagation medium comprising, in combination:

master acoustical transducer means for emitting a burst of acoustical pulses and for receiving acoustical signals in said medium at one of said stations;

slave acoustical transducer means for emitting an acoustical signal in said medium at said other station in response to reception of said burst of acoustical pulses emitted by said master acoustical transducer means;

means for computing the time T which elapses during the interval starting with the emission of said burst of acoustical pulses by said master transducer means and ending with the reception by said master transducer means of an acoustical signal emitted in response thereto by said slave transducer means;

reference acoustical transducer means for receiving said burst of acoustical pulses at a predetermined distance D from said master acoustical transducer means;

means for generating a first electrical pulse train signal corresponding with said burst of acoustical pulses emitted by said master transducer means;

means for converting said burst of acoustical pulses received by said reference acoustical transducer means into a second electrical pulse train signal;

gate means having first and second inputs coupled to said pulse train signal generating means for receiving said first and second electrical pulse train signals, respectively, said gate means having an output for conducting a pulse train signal characterized by pulses having a width proportional to the duration of coincidence of pulses in said first and second electrical pulse train signals;

integrator means coupled to the output of said gate means for producing a phase angle factor $\phi$ proportional to the integrated sum of the output pulse train signal of said gate means; and, computing means coupled to said time computing means and to said integrating means for computing the ratio $L = KfDT/\phi$ where:

L = length between the two stations;
K = calibration constant;
f = pulse repetition frequency of the acoustical burst;
D = distance between the master transducer and the reference transducer;
T = round trip propagation time of sound wave between master transducer and the slave transducer; and,
$\phi$ = phase angle factor.

2. A method for measuring the distance L between two stations in a propagation medium comprising, in combination:

(a) emitting a burst of acoustical pulses in said medium at one of said stations;

(b) emitting an acoustical signal in said medium at the other station in response to the reception of said burst of acoustical pulses emitted in step (a);

(c) computing the time T which elapses during the interval starting with the emission of said burst of acoustical pulses from said one station and ending with the reception of said acoustical signal emitted in response thereto from the other station;

(d) receiving said burst of acoustical pulses at a predetermined distance D from said one station;

(e) generating a first electrical pulse train signal corresponding with said burst of acoustical pulses;

(f) converting said burst of acoustical pulses received at said predetermined distance D into a second electrical pulse train signal;

(g) generating a pulse train signal having pulses characterized by width proportional to the duration of coincidence of the pulses in the first and second electrical pulse train signals;

(h) integrating the pulse train signal for producing a phase angle factor $\phi$ proportional to the integrated sum of the output pulse train signal; and, (i) computing the ratio $L = KfDT/\phi$ where:

L = length between the two stations;
K = calibration constant;
f = pulse repetition frequency of the acoustical burst;
D = distance between the master transducer and the reference transducer;
T = round trip propagation time of sound wave between master transducer and the slave transducer; and,
$\phi$ = phase angle factor.

3. Apparatus for measuring the distance between two stations in a propagation medium comprising:

master acoustical transducer means for emitting a burst of acoustical pulses and for receiving acoustical signals in said medium at one of said stations;

slave acoustical transducer means for emitting an acoustical signal in said medium at the other station in response to the reception of said burst of acoustical pulses emitted by said master acoustical transducer means;

measurement means for measuring the time which elapses during the interval starting with the emission of said burst of acoustical pulses by said master transducer means and ending with the reception by said master transducer means of an acoustical signal emitted in response thereto by said slave transducer means;

reference acoustical transducer means for receiving said burst of acoustical pulses at a predetermined distance from said master acoustical transducer means;

means for generating a first electrical pulse train signal corresponding with said burst of acoustical pulses emitted by said master transducer means;

means for converting said burst of acoustical pulses received by said reference acoustical transducer means into a second electrical pulse train signal;

means for generating a phase angle correction factor in response to the duration of coincidence of pulses in said first and second electrical pulse train signals; and means for calculating the distance between said one station and said other station in response to said measured time and said phase angle correction factor.

4. Apparatus for measuring the distance between two stations in a propagation medium according to claim 3 wherein said means for generating a phase angle correction factor in response to said duration of coincidence of pulses in said first and seond electrical pulse trains includes logic gate means having a first input coupled to said first electrical pulse train, a second input coupled to said second electrical pulse train and an output only during those periods of time when said first electrical pulse train and said second electrical pulse train are coincident.

5. Apparatus for measuring the distance between two stations in a propagation medium according to claim 4 further including integrator means coupled to said output of said logic gate means.

6. Apparatus for measuring the distance between two stations in a propagation medium according to claim 3 wherein said means for calculating the distance between said one station and said other station in response to said measured time and said phase angle correction factor comprises an appropriately programmed microprocessor.

7. A method for measuring the distance between two stations in a propagation medium comprising:
- emitting a burst of acoustical pulses in said medium at a first one of said two stations;
- emitting an acoustical signal in said medium at a second one of said two stations in response to the reception of said burst of acoustical pulses from said first one of said two stations;
- measuring the time which elapses during the interval starting with the emission of said burst of acoustical pulses from said first station and ending with the reception of said acoustical signal emitted in response thereto from said second station;
- receiving said burst of acoustical pulses at a predetermined distance from said first station;
- generating a first electrical pulse train signal corresponding with said burst of acoustical pulses;
- converting said burst of acoustical pulses received at a predetermined distance from said first station into a second electrical pulse train signal;
- generating a phase angle correction factor in response to the duration of coincidence of pulses in said first and second electrical pulse train signals; and
- calculating the distance between said first station and said second station in response to said measured time and said phase angle correction factor.

* * * * *